R. Montgomery.
Mode of Constructing Iron Ships.
Nº 26,307.  Patented Dec. 6, 1859.
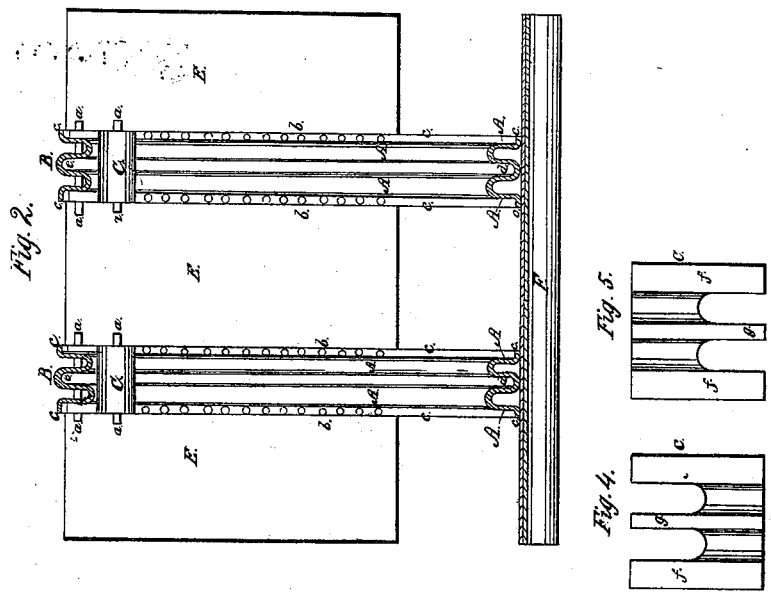
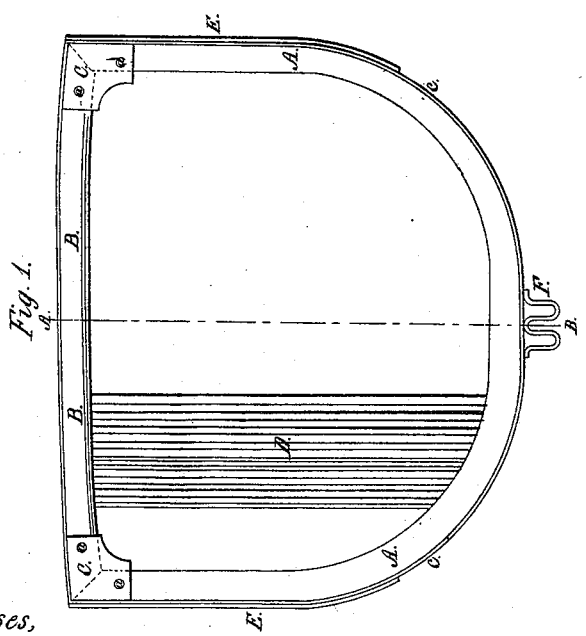
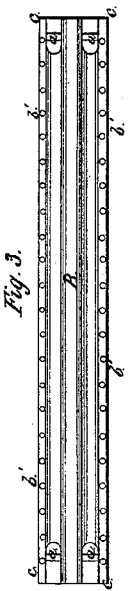
Witnesses,
Thos. H. Dodge
John Quincy Adams
Inventor:
R. Montgomery

UNITED STATES PATENT OFFICE.

RICHARD MONTGOMERY, OF NEW YORK, N. Y.

IRON SHIP.

Specification forming part of Letters Patent No. 26,367, dated December 6, 1859; Reissued May 15, 1866, Nos. 2,243 and 2,244.

*To all whom it may concern:*

Be it known that I, RICHARD MONTGOMERY, of the city, county, and State of New York, have invented certain new and useful Improvements in the Mode of Constructing Iron Ships; and I do hereby declare that the following is a full, clear, and exact description thereof, reference being had to the accompanying drawings, and to the letters of reference marked thereon, forming a part of this specification, in which—

Figure 1 represents a side view of one of a series of corrugated iron supports A, corrugated cross beams B, and knee joints C, of which the frame or shell of the hull is composed. Fig. 2, represents a sectional view on line A B, Fig. 1. Fig. 3, represents a top or plan view of beam B. Figs. 4 and 5, represent views of knee joint C, detached.

The frame or shell of the hull of the iron vessel is composed of a series of corrugated iron supports A. These supports are corrugated as shown in Fig. 2, the edges $c$, being flat, form the necessary margins by and to which the iron sheets or plates E, which form the covering and sides of the hull are fastened. The plates E, are fastened to the corrugated supports A by means of rivets $b$.

The corrugated supports A, are all curved and united at their ends by means of corrugated cross beams B, and knee joints C, as fully shown in Figs. 1 and 2. The cross beams B, are corrugated in a similar manner to the supports A, and have flat margins $c$, to which the iron floor can be securely riveted by bolts passing through holes $b$.

The beams B, are or may be slightly arched, as shown in Fig. 1.

The knee joints C, may be made of cast iron, and should have projecting sides $f, f$, and a tongue $g$, so that when in place as shown in Fig. 1 they will interlock with both the corrugated supports A, and cross beams B, and to which they are fastened by rivets or bolts $a$.

The ends of the cross beams B, and bottom supports A, instead of being beveled off as shown in dotted lines Fig. 1, may be square, in which case it would be best to let the ends of cross beams B, project over and rest on the ends of A.

The bottom of the hull may be supported and strengthened if desired by means of corrugated iron beams F.

The entire hull is to be divided into separate divisions by means of corrugated iron plates D, the ends of which are to be fitted in the corrugations $c$, of the beams B, and the corrugations $d$, in the bottom supports A.

It will thus be seen that by my mode of constructing the hulls of iron vessels, the cross beams B, and bottom supports A, by their peculiar construction and relative arrangement afford facilities for dividing the entire hull into water tight divisions, and that too without the necessity of using rivets to fasten the ends of the plates D, since all that is necessary to do, is to calk the ends of the plates in the corrugations $e$, and $d$.

By the above mode of constructing the hulls of iron vessels, great strength is combined with a small amount of metal, while at the same time the cost of construction is much less than by the ordinary modes of constructing iron vessels.

Having described my invention, what I claim as new and desire to secure by Letters Patent, is.

1. I claim forming the supports or frame to which the side covering E, is attached, of iron or other metal, corrugated in the form and for the purposes substantially as above described.

2. I claim the combination and arrangement of the corrugated cross beams B, and corrugated bottom supports A, with the iron divisions D, substantially as and for the purposes set forth.

R. MONTGOMERY.

Witnesses:
  THOS. H. DODGE,
  JOHN Q. ADAMS.